United States Patent [19]

Pritchard

[11] Patent Number: 5,836,847
[45] Date of Patent: Nov. 17, 1998

[54] SYNCHRONIZED RANGE SHIFT FOR TWO-SPEED TRANSFER CASE

[75] Inventor: Larry A. Pritchard, Sterling Heights, Mich.

[73] Assignee: New Venture Gear, Inc., Troy, Mich.

[21] Appl. No.: 748,252

[22] Filed: Nov. 12, 1996

[51] Int. Cl.[6] ............................................. F16H 37/08
[52] U.S. Cl. ........................ 475/204; 475/198; 180/247
[58] Field of Search ............................. 475/198, 204, 475/209, 210, 206, 207, 269, 296, 317; 180/247, 248, 249

[56] References Cited

U.S. PATENT DOCUMENTS

| | | | |
|---|---|---|---|
| 4,569,252 | 2/1986 | Harper. | |
| 5,046,998 | 9/1991 | Frost | 475/204 X |
| 5,335,747 | 8/1994 | Muller | 475/206 X |
| 5,346,442 | 9/1994 | Eastman. | |
| 5,363,938 | 11/1994 | Wilson et al. | 180/247 X |
| 5,380,255 | 1/1995 | Brissenden et al. | 475/206 X |
| 5,443,426 | 8/1995 | Frost | 180/248 X |
| 5,478,290 | 12/1995 | Buuck et al. | 475/269 X |
| 5,503,603 | 4/1996 | Adam et al. | 475/204 |
| 5,643,129 | 7/1997 | Richardson | 475/204 |
| 5,651,749 | 7/1997 | Wilson et al. | 475/198 X |
| 5,655,986 | 8/1997 | Wilson et al. | 475/204 |

FOREIGN PATENT DOCUMENTS 9010806  9/1990  European Pat. Off. .

*Primary Examiner*—Charles A. Marmor
*Assistant Examiner*—Peter T. Kwon
*Attorney, Agent, or Firm*—Harness, Dickey & Pierce, P.L.C.

[57] ABSTRACT

A planetary gear assembly is disclosed having a sun gear fixed for rotation with an input, a ring gear, and a planet carrier fixed for rotation with an output and which has a plurality of planet gears rotatably supported thereon that mesh with the sun gear and the ring gear. To establish the high and low-range drive connections between the input and the output, a first range sleeve is supported for rotation with the input and is movable between a neutral position and an engaged position whereat the input is coupled to the planet carrier. In addition, a second range sleeve is supported for rotation with the ring gear and is movable between a neutral position and an engaged position whereat the ring gear is coupled to a stationary brake plate. Accordingly, the high-range drive connection between the input and the output is established when the first range sleeve is in its engaged position and the second range sleeve is in its neutral position. Moreover, the low-range drive connection between the input and the output is established when the first range sleeve is in its neutral position and the second range sleeve is in its engaged position. Finally, a neutral mode is established whereat the output is not driven by the input when both the first and second range sleeves are in their respective neutral positions.

15 Claims, 2 Drawing Sheets

SYNCHRONIZED RANGE SHIFT FOR TWO-SPEED TRANSFER CASE

BACKGROUND OF THE INVENTION

The present invention relates to a dual-speed planetary gear assembly of the type used in motor vehicles drivetrain applications.

Planetary or epicyclic transmissions are widely used in various vehicular drivetrain applications to provide at least two distinct speed ratio drive connections between an input shaft and an output shaft. Such transmissions typically include a set of intermeshed gear components such as a set of planet gears rotatably carried by a planet carrier and which are meshed with a sun gear and a ring gear. Conventionally, a first gear component is fixed to rotate with the input shaft, a second gear component is fixed to rotate with the output shaft, and a third gear component is selectively clutched to one of the first and second gear components for establishing a direct speed ratio drive connection or to a fixed component to establish an indirect speed ratio drive connection.

Such two-speed planetary transmissions are most commonly used as either an auxiliary range (i.e., splitter) gearbox adapted for connection in series to a conventional multi-speed power transmission or as a gear reduction unit in a four-wheel drive transfer case. Auxiliary range gearbox arrangements are disclosed in U.S. Pat. No. 4,569,252 and International Application No. WO90/10806. In the alternative, commonly-owned U.S. Pat. Nos. 5,076,112 and 5,346,442 disclose four-wheel drive transfer cases equipped with dual-speed planetary gear assemblies.

A disadvantage commonly associated with conventional two-speed planetary transmissions is that the planet gears are subjected to high loading during operation in the direct mode which, in most applications, is the majority of the operating time. For this reason, attempts have been made to reduce the torque loading on the planetary gear components during direct operation. Above-noted U.S. Pat. No. 4,569,252 addresses this problem by providing a sliding ring gear that is selectively coupled to either the input shaft or the sun gear when the direct mode is established. While such an arrangement may reduce the resulting gear loading, it will be recognized that inherent limitations are associated with the use of a sliding ring gear that must be selectively coupled to another component. Thus, a need exists to develop further alternatives in the field of two-speed planetary transmissions which improve upon prior art devices.

SUMMARY OF THE INVENTION

Accordingly, the present invention is directed to a two-speed planetary transmission which is adapted to reduce the loading exerted on its gear components to provide better durability and service life.

The two-speed planetary transmission of the present invention is well-suited for use in vehicular drivetrain applications and, specifically, for use as a two-speed gear reduction unit in a four-wheel drive transfer case.

It is therefore a further object of the present invention to provide a synchronized shift arrangement for the planetary gear reduction unit which permits "on-the-fly" shifting between a direct (i.e., high-range) operating mode and an indirect (i.e., low-range) operating mode. Accordingly the shift arrangement of the present invention permits a vehicle operator to shift the transfer case between its four-wheel high-range and low-range drive modes without stopping the vehicle.

Accordingly to a preferred embodiment of the present invention, the planetary gear assembly includes a sun gear fixed for rotation with an input, a ring gear, and a planet carrier fixed for rotation with an output and which has a plurality of planet gears rotatably supported thereon that mesh with the sun gear and the ring gear. To provide means for establishing the high and low-range drive connections between the input and the output of the transfer case, the present invention includes a first range sleeve supported for rotation with the input and which is movable between a neutral position and an engaged position whereat the input is coupled to the planet carrier. In addition, a second range sleeve is supported for rotation with the ring gear and is movable between a neutral position and an engaged position whereat the ring gear is coupled to a stationary brake plate. Accordingly, the high-range drive connection between the input and the output is established when the first range sleeve is in its engaged position and the second range sleeve is in its neutral position. Moreover, the low-range drive connection between the input and the output is established when the first range sleeve is in its neutral position and the second range sleeve is in its engaged position. Finally, a neutral mode is established whereat the output is not driven by the input when both the first and second range sleeves are in their respective neutral positions.

To facilitate "on-the-fly" shifting between the low-range operating mode and the high-range operating mode, each range sleeve includes a synchronizer arrangement for causing speed synchronization between the corresponding selectively engageable parts.

Addition objects, features and advantages of the present invention will become apparent from studying the following detailed description and appended claims when taken in conjunction with the accompanying drawings.

DESCRIPTION OF THE PREFERRED EMBODIMENTS

In general, the present invention relates a planetary gear assembly and a shift mechanism that cooperate for providing a means for shifting a four-wheel drive transfer case between a high-range and a low-range drive mode. Thus, the present invention has particular applicability for use in two-speed transfer cases to permit the vehicle operator to shift "on-the-fly" between the available speed ranges.

Figure 1:
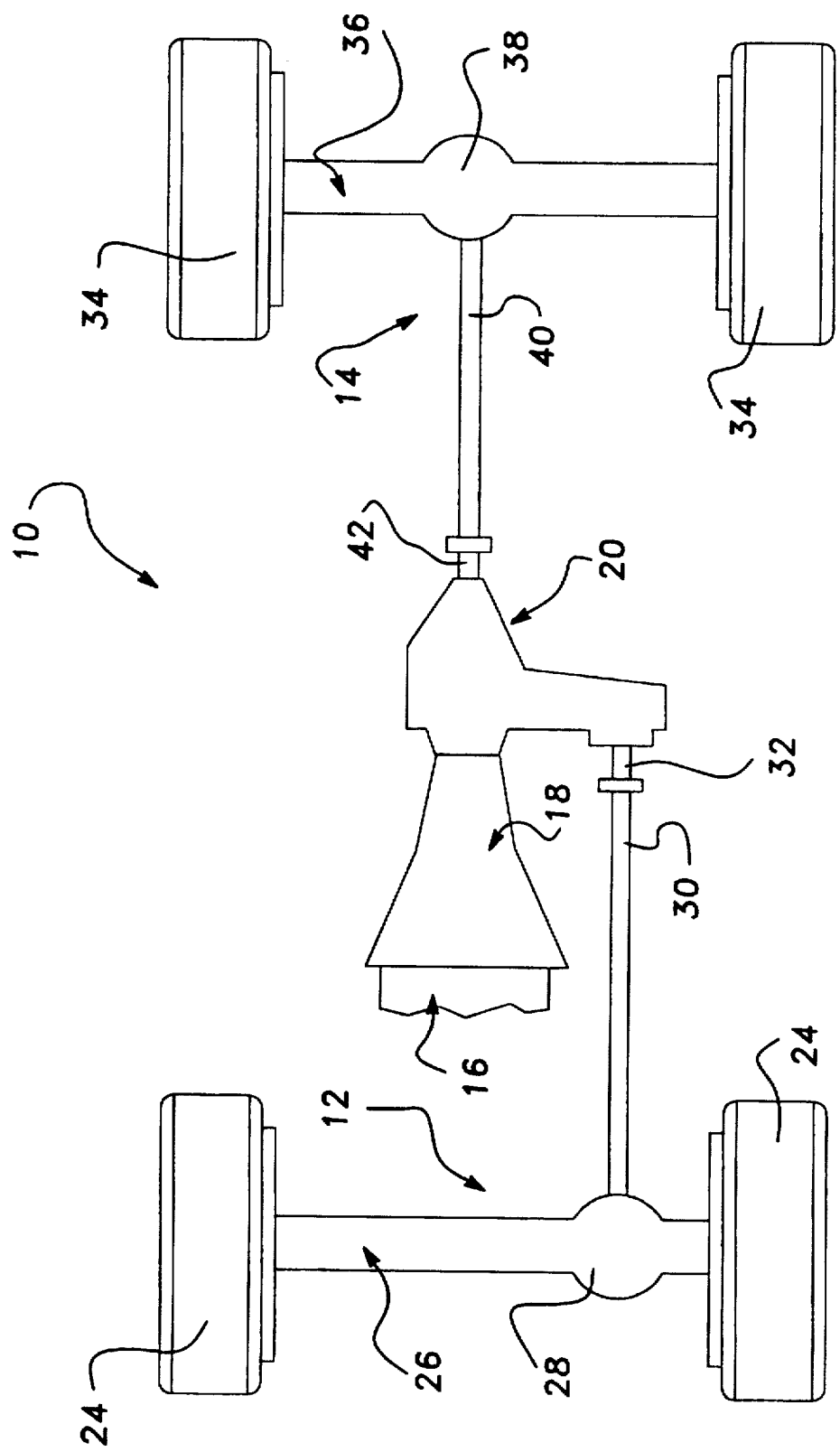
FIG. 1 illustrates the drivetrain of a four-wheel drive motor vehicle equipped with the transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a part-time four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair of rear wheels 34 connected at opposite ends of a rear axle assembly 36 having a differential 38 coupled to one end of a rear propshaft 40, the opposite end of which is interconnected to a rear output shaft 42 of transfer case 20.

Figure 2:
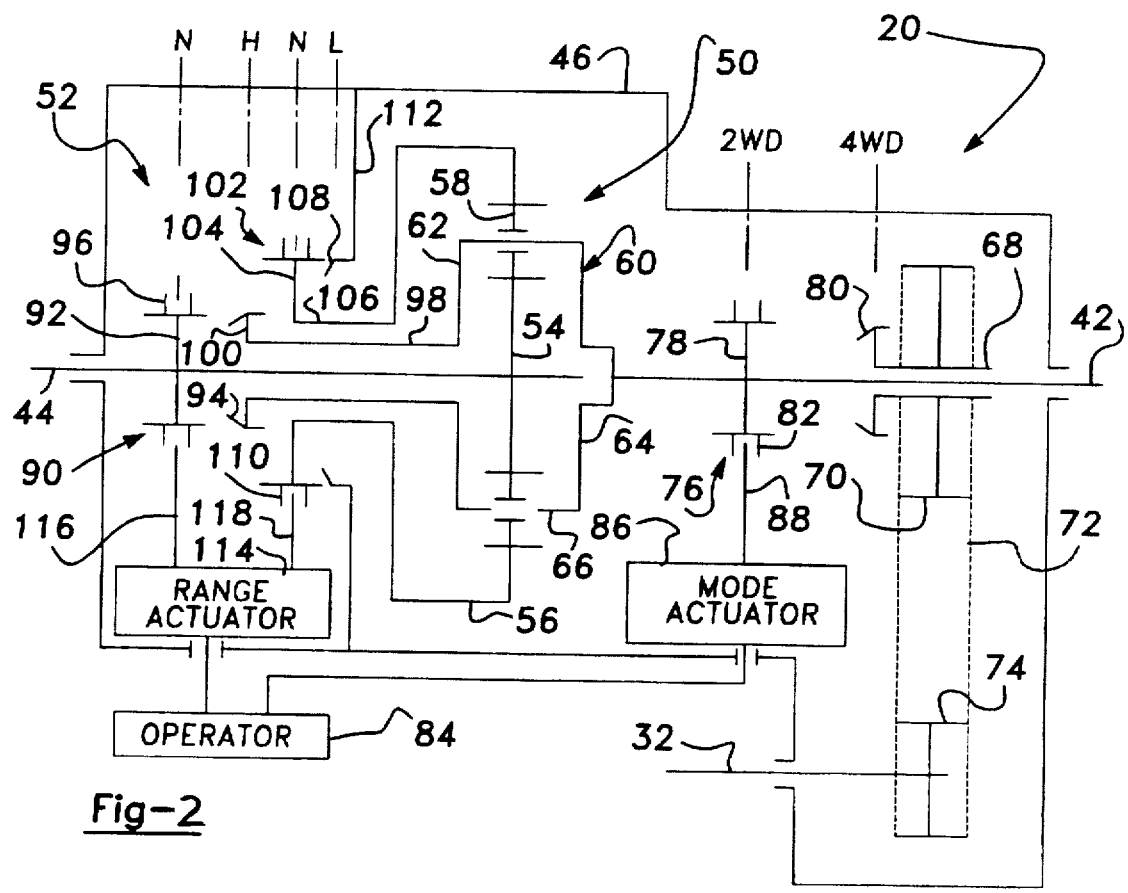
FIG. 2 is a schematic drawing of the transfer case according to a preferred embodiment of the present invention.

With particular reference to FIG. 2 of the drawings, transfer case 20 is schematically shown to include an input shaft 44 that is rotatably supported in a housing 46. Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46. As noted, front output shaft 32 is adapted for connection to front propshaft 30 and rear output shaft 42 is adapted for connection to rear propshaft 40. Transfer case 20 is shown to also include a planetary gear assembly 50 that is operably installed between input shaft 44 and rear output shaft 42. As will be detailed, planetary gear assembly 50 is operable in a high-range operating mode for driving rear output shaft 42 at a direct speed ratio (i.e., 1:1) relative to input shaft 44. Additionally, planetary gear assembly 50 is also operable in a low-range operating mode for driving rear output shaft 42 at a reduced ratio (i.e., 0.37:1) relative to input shaft 44. Finally, planetary gear assembly 50 is operable in a neutral operating mode for interrupting the transfer of drive torque from input shaft 44 to rear output shaft 42. Transfer case 20 is further equipped with a synchronized range shift mechanism 52 for permitting the vehicle operator to shift between the various operative modes without stopping the vehicle.

Planetary gear assembly 50 includes a sun gear 54 fixed for rotation with input shaft 44, a ring gear 56, and a set of planet gears 58 rotatably supported on a planet carrier 60 and which each mesh with sun gear 54 and ring gear 56. Planet carrier 60 is shown to include a front carrier ring 62 that is suitably connected to a rear carrier ring 64 and between which is mounted pinion shaft 66 on which each planet gear 58 is rotatably supported.

As seen in FIG. 2, input shaft 44 and rear output shaft 42 are preferably aligned for rotation about a common longitudinal axis with front output shaft 32 offset therefrom. While not critical to the present invention, means are provided for transferring drive torque from rear output shaft 42 to front output shaft 32. In the embodiment shown, a chain carrier 68 is rotatably journalled on rear output shaft 44 and includes a drive sprocket 70 drivingly engaging a chain, shown in dashed lines at 72, and which is coupled to a lower driven sprocket 74. Driven sprocket 74 is fixed to front output shaft 32. A mode clutch 76 is shown for permitting the vehicle operator to selectively couple chain carrier 68 for rotation with rear output shaft 42 for shifting transfer case 20 from a two-wheel drive mode into a part-time four-wheel mode. In the part-time four-wheel drive mode, front output shaft 32 is rigidly connected for rotation with rear output shaft 42. Mode clutch 76 includes a hub 78 fixed to rear output shaft 42, a synchronizer 80, and a mode sleeve 82. Mode sleeve 82 is splined to hub 78 for rotation therewith and axial sliding movement thereon between a 2 WD position and a 4 WD position. In the 2 WD position, chain carrier 68 is disconnected from rear output shaft 42 such that all drive torque through transfer case 20 is delivered to rear driveline 14, thereby establishing the two-wheel drive mode. When mode sleeve 82 is moved from the 2 WD position shown to its 4 WD position, it releasably couples chain carrier 68 to rear output shaft 42 for establishing the part-time four-wheel drive mode. As is conventional, synchronizer 80 inhibits complete movement of mode sleeve 82 to its 4 WD position until speed synchronization has been completed between rear output shaft 42 and chain carrier 68 to permit the vehicle operator to shift "on-the-fly" between the two-wheel drive and part-time four-wheel drive modes. An operator is schematically shown by block 84 for controlling actuation of a mode actuator 86 which, in turn, controls movement of mode sleeve 82 between its 2 WD and 4 WD positions in response to an input from the vehicle operator. A mode fork 88 couples mode sleeve 82 to mode actuator 86.

To provide means for selectively establishing the high-range and low-range drive connections between input shaft 44 and rear output shaft 42, synchronized range shift mechanism 52 is provided with conjunction with planetary gear assembly 50. As noted, synchronized range shift mechanism 52 is operable for permitting transfer case 20 to be shifted "on-the-fly" between its high-range and low-range drive modes. Synchronized range shift mechanism 52 includes a first range clutch 90 that is operable for selectively coupling input shaft 44 to planet carrier 60. In general, first range clutch 90 is operable in a first state for permitting relative rotation between input shaft 44 and planet carrier 60 and in a second state for inhibiting such relative rotation. First range clutch 90 includes a hub 92 that is fixed to input shaft 44, a synchronizer 94, and a first range sleeve 96 that is supported for rotation with hub 92 and axial movement thereon. Synchronizer 94 is operably located between hub 92 and an axial extension 98 of planet carrier 60 that extends from front carrier ring 62. Synchronizer 94 includes a clutch plate 100 that is fixed to axial extension 98 of planet carrier 60. Synchronizer 94 is operable for establishing speed synchronization between input shaft 44 and planet carrier 60 prior to permitting movement of range sleeve 96 from the neutral position (denoted by position line "N") shown to a high-range position (denoted by position line "H") whereat range sleeve 96 is drivingly coupled to clutch plate 100. Accordingly, with range sleeve 96 positioned in its neutral position planet carrier 60 can rotate relative to input shaft 44. In contrast, when range sleeve 96 is in its high-range position, planet carrier 60 is locked to input shaft 44 and relative rotation therebetween is inhibited.

Synchronized range shift mechanism 52 further includes a second range clutch 102 that is operable for selectively coupling ring gear 56 to housing 46. In general, second range clutch 102 is operable in a first state for permitting rotation of ring gear 52 relative to housing 46 and in a second state for inhibiting such relative rotation. Second range clutch 102 includes a hub 104 that is fixed to an axial extension 106 of ring gear 56, a synchronizer 108, and a second range sleeve 110 that is supported on hub 104 for rotation therewith and axial movement thereon. Synchronizer 108 is operably located between hub 104 and a second clutch plate 112 that is fixed to housing 46. Synchronizer 108 is operable for establishing speed synchronization between ring gear 56 and housing 46 prior to permitting second range sleeve 110 to move from its neutral position (denoted by position line "N") shown to a low-range position (denoted by position line "L") whereat second range sleeve 110 is coupled to second clutch plate 112. As will be appreciated, second synchronizer 108 functions as a brake for stopping rotation of ring gear 56. Accordingly, with first range sleeve 96 positioned in its high-range position and second range sleeve 110 located in its neutral position, planet carrier 60 is fixed for common rotation with input shaft 44, thereby establishing the high-range drive mode. Thus, rear output shaft 42 is driven at the same speed as input shaft 42. However, when first range sleeve 96 is positioned in its neutral position and second range sleeve 110 is positioned in its low-range position, the low-range drive mode is established between input shaft 44 and carrier assembly 60. Specifically, since ring gear 56 is held stationary relative to housing 46, planet carrier 60 is driven at a reduced speed relative to input shaft 44. Finally, with first and second range sleeves 96 and 108 in their respective neutral positions, the neutral non-driven mode is established.

Referring still to FIG. 2, a range actuator 114 is shown to control the coordinated movement of a first shift fork 116 coupled to first range sleeve 96 and a second shift fork 118 coupled to second range sleeve 108. Range actuator 114 is operable for causing coordinated movement of first and second range sleeves 96 and 108 in response to a particular drive mode selected by the vehicle operator via manipulation of operator 84. Range actuator 114 can be any suitable apparatus that is operable for moving shift forks 116 and 118 and, in turn, range sleeves 96 and 108 between each of their distinct positions. Preferably, a rotatable sector plate arrangement, similar to that described in commonly-owned U.S. Pat. No. 5,076,112 and hereby incorporated by reference, can be used as range actuator 114 with transfer case 20. It is contemplated that such a sector-type operator arrangement can be commonly used for mode actuator 86 to also coordinate movement of mode sleeve 82 between its two-wheel drive and four-wheel positions. It will be appreciated that operator 84 can be any suitable mechanically-actuated (i.e., a linkage coupled to a gear shift lever) or a power actuated (i.e., a motor controlled by mode signals from push buttons) arrangement under the control of the vehicle operator which controls actuation of actuators 114 and 116 for establishing the particular drive mode selected by the vehicle operator.

Preferably, transfer case 20 is adapted to provide a two-wheel high-range drive mode, a part-time four-wheel high-range drive mode, a neutral non-driven mode, and a part-time four-wheel low-range drive mode. Accordingly, when it is desired for transfer case 20 to operate in its two-wheel high-range drive mode, the vehicle operator manipulates operator 84 for causing mode actuator 86 to locate mode sleeve 82 in its 2 WD position as well as positioning first range sleeve 96 in its high-range position and second range sleeve 108 in its neutral position. Likewise, when it is desired to shift transfer case 20 into its part-time four-wheel high-range drive mode, operator 84 is manipulated to maintain first range sleeve 96 in its high-range position and second range sleeve 108 in its low-range position while shifting mode sleeve 82 from its 2 WD position to its 4 WD position. When it is desired to shift transfer case 20 into its part-time four-wheel low-range drive mode, operator 84 is manipulated to cause mode actuator 86 to maintain mode sleeve 82 in its 4 WD position while moving first range sleeve 96 to its neutral position and second range sleeve 108 to its low-range position. Finally, when it is desired to shift transfer case 20 to its neutral mode, range actuator 114 is operable for locating range sleeves 96 and 108 in their respective neutral positions.

Figure 3:
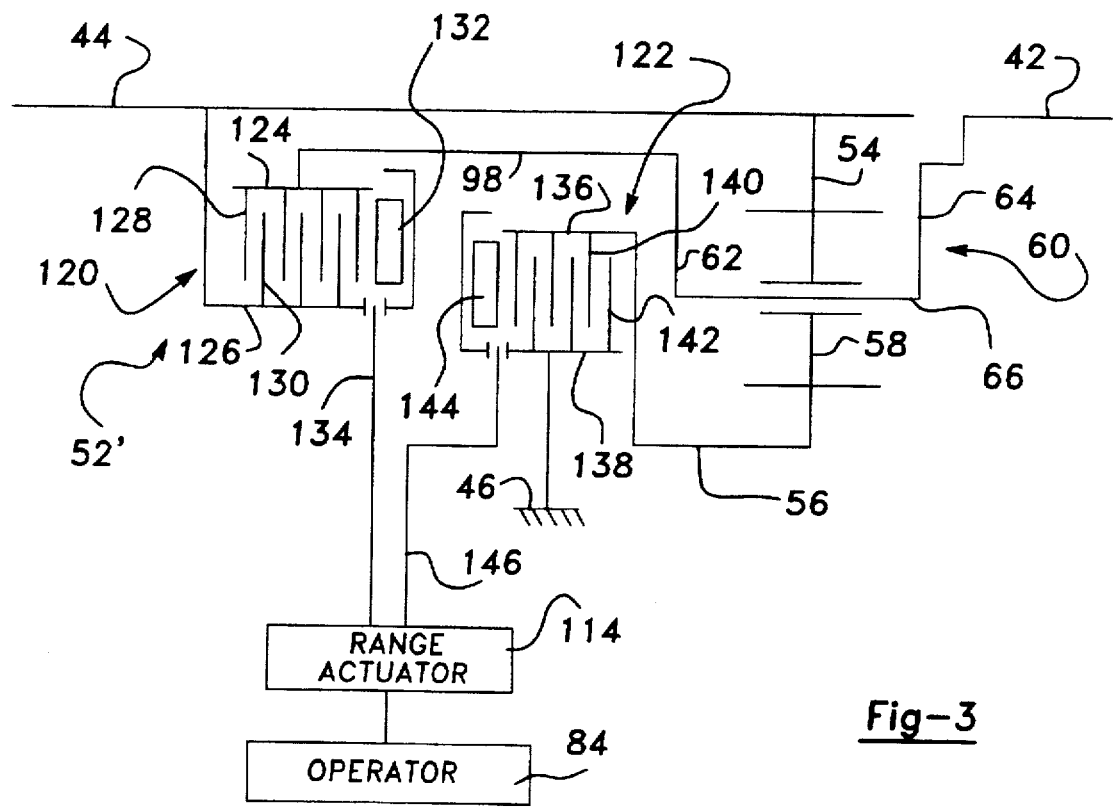
FIG. 3 is a partial schematic drawing showing an alternative embodiment for the transfer case of the present invention.

Referring specifically now to FIG. 3, transfer case 20 is shown equipped with planetary gear assembly 50 operably associated with a modified range shift mechanism 52' for shifting on-the-fly between the high-range and low-range drive modes. In general, FIG. 3 illustrates a "power shift" type of range shift mechanism that is substituted for the synchronized range shift mechanism 52 shown in FIG. 2. As such, the same reference numerals are used to identify common or substantially similar components. Range shift mechanism 52' permits automatic or selective range shifting of transfer case 20. Range shift mechanism 52' includes a first multi-plate clutch 120 that can be selectively actuated for coupling input shaft 44 to planet carrier 60 and a second multi-plate clutch 122 that can be selectively actuated for coupling ring gear 56 to housing 46.

With continued reference to FIG. 3, first clutch 120 is shown to include an inner drum 124 that is fixed to axial extension 98 of planet carrier 60 and an outer drum 126 that is fixed to housing 46. First clutch assembly 120 includes a set of inner clutch plates 128 fixed for rotation with inner drum 124 and which are alternately interleaved with a set of outer clutch plates 130 fixed for rotation with outer drum. A thrust mechanism 132 is provided for applying a compressive clutch engagement force on the interleaved clutch plates. Movement of thrust mechanism 132 is controlled by range actuator 114. In the embodiment, range actuator 114 may be any power-operated (i.e., motor driven, electromagnetic, hydraulic, etc.) device or system operable for actuating first clutch assembly 120. Leadline 134 represents the mechanical, electrical or hydraulic connection between range actuator 114 and thrust mechanism 132 for controlling actuation of first clutch assembly 120. Thus, first clutch assembly 120 is operable in a non-actuated mode wherein a minimum clutch engagement force is exerted by thrust mechanism 132 on the interleaved clutch plates such that planet carrier 60 is permitted to rotate relative to input shaft 44. In addition, first clutch assembly is also operable in a fully-actuated mode wherein a maximum clutch engagement force is exerted by thrust mechanism 132 on the interleaved clutch plates such that planet carrier 60 is rigidly coupled for common rotation with input shaft 44.

Second clutch assembly 122 includes inner drum 136 that is fixed to ring gear 56 and an outer drum 138 that is fixed to housing 46. Second clutch assembly 122 includes a set of inner clutch plates 140 fixed for rotation with inner drum 136 and which are alternately interleaved with a set of outer clutch plates 142 fixed for rotation with outer drum. A thrust mechanism 144 is provided for exerting a compressive clutch engagement force on the interleaved clutch plates for controlling actuation of second clutch assembly 122. Leadline 146 indicates the connection between range actuator 114 and thrust mechanism 144 for controlling actuation of second clutch assembly 122. Second clutch assembly 122 is operable in a non-actuated mode in which a minimum clutch engagement force is applied to the interleaved clutch plates, whereby ring gear 56 is free to rotate relative to housing 46. In addition, second clutch assembly 122 is operable in a fully-actuated mode such that a maximum clutch engagement force is exerted on the clutch plates for rigidly coupling ring gear 56 to housing 46.

In operation, when first clutch assembly 120 is in its actuated mode and second clutch assembly 122 in its non-actuated mode, planet carrier 60 is coupled for common rotation with input shaft 44, thereby establishing the high-range drive mode. Likewise, when first clutch assembly 120 is in its non-actuated mode and second clutch assembly 122 is in its actuated mode, ring gear 56 is grounded to housing 46 for establishing the low-range drive mode. Finally, when first clutch assembly 120 is in its non-actuated mode and second clutch assembly 122 is in its non-actuated mode, the neutral non-driven mode is established. Range actuator 114 is operable for causing coordination actuation of first and second clutch assemblies 120 and 122 in response to the particular drive mode selected by the vehicle operator via manipulation of operator 84. Alternatively, operator 84 could be an automatic control system in which the actuated condition of each of the clutch assemblies 120 and 122 is automatically controlled in response to specific vehicle operating parameters and conditions detected by various vehicle-mounted sensors.

The foregoing discussion discloses and describes various embodiments of the present invention. It is contemplated that the various alternatives for the range shift mechanism can be used in virtually any part-time, full-time or on-demand transfer case. Thus, any torque transfer mechanism (i.e., interaxle differential, speed-dependent viscous clutch, electronically-controlled clutch, etc.) can be substituted for the synchronized mode shift system disclosed and is considered an equivalent thereto. One skilled in the art will readily recognize from such discussion, and from the complete drawings and claims that various changes, modifications and variations can be made therein without departing from the true spirit and fair scope of the invention as defined in the following claims.

What is claimed is:

1. A transfer case for use in a four-wheel drive vehicle having a power source and front and rear drivelines comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

means for transferring drive torque from said rear output shaft to said front output shaft;

a planetary gear assembly interconnecting said input shaft to said rear output shaft for delivering drive torque thereto, said planetary gear assembly having a sun gear fixed for rotation with said input shaft, a ring gear, and a planet carrier rotatably supporting a set of planet gears meshed with said sun gear and said ring gear;

a first range sleeve coupled for rotation with said input shaft and movable between a neutral position whereat said planet carrier is free to rotate relative to said input shaft and a high-range position whereat said first range sleeve couples said planet carrier for common rotation with said input shaft;

a second range sleeve coupled for rotation with said ring gear and movable between a neutral position whereat said ring gear is free to rotate relative to said housing and a low-range position whereat said range sleeve couples said ring gear to said housing; and an actuator for moving said first and second range sleeves to establish one of a high-range drive mode, a low-range drive mode and a neutral non-driven drive mode, wherein said actuator is operable for locating said first range sleeve in its high-range position and said second range sleeve in its neutral position for establishing said high-range drive mode, wherein said actuator is operable for locating said first range sleeve in its neutral position and said second range sleeve in its low-range position for establishing said low-range drive mode, and wherein said actuator is operable for locating said first range sleeve in its neutral position and said second range sleeve in its neutral position for establishing said neutral non-driven mode.

2. The transfer case of claim 1 further comprising a first synchronizer for causing speed synchronization between said input shaft and said planet carrier in response to movement of said first range sleeve from its neutral position to its high-range position, and a second synchronizer for causing speed synchronization between said ring gear and said housing in response to movement of said second range sleeve from its neutral position to its low-range position.

3. A two-speed planetary gear assembly comprising:

an input shaft;

an output shaft;

a sun gear fixed to said input shaft;

a ring gear;

a planet carrier fixed to said output shaft and rotatably supporting a set of planet gears meshed with said sun gear and said ring gear;

a first clutch operable in a first state for permitting rotation of said planet carrier relative to said input shaft and in a second state for inhibiting such relative rotation;

a second clutch operable in a first state for permitting relative rotation between said ring gear and a stationary component and in a second state for inhibiting rotation of said ring gear; and an actuator for controlling the actuated states of said first and second clutches to establish one of a high-range and a low-range drive connection between said input shaft and said output shaft, said actuator is operable for shifting said first clutch into its second state and said second clutch into its first state to establish said high-range drive connection, and said actuator is operable for shifting said first clutch into its first state and said second clutch into its second state to establish said low-range drive connection, and said actuator is further operable for shifting said first clutch into its first state and said second clutch into its first state to establish a non-driven mode such that said output shaft is not driven by said input shaft.

4. The two-speed planetary gear assembly of claim 3 wherein said first clutch is a first synchronizer clutch including a first range sleeve that is located in a neutral position to define said first state and a high-range position to define said second state, said actuator being operable for moving said first range sleeve between its neutral and high-range positions.

5. The two-speed planetary gear assembly of claim 4 wherein said second clutch is a second synchronizer clutch including a second range sleeve that is located in a neutral position to define said first state and a low-range position to define said second state, said actuator being operable for moving said second range sleeve between its neutral and low-range positions.

6. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

means for transferring drive torque from said rear output shaft to said front output shaft;

a planetary gear assembly interconnecting said input shaft to said rear output shaft for delivering drive torque thereto, said planetary gear assembly having a sun gear fixed for rotation with said input shaft, a ring gear, and a planet carrier rotatably supporting a set of planet gears meshed with said sun gear and said ring gear;

a first clutch assembly located between said input shaft and said planet carrier, said first clutch assembly is operable in a non-actuated mode for permitting said planet carrier to rotate relative to said input shaft, and said first clutch assembly is operable in an actuated mode for coupling said planet carrier to said input shaft;

a second clutch assembly located between said ring gear and said housing, said second clutch assembly is operable in a non-actuated mode for permitting said ring gear to rotate relative to said housing, and said second clutch assembly is operable in an actuated mode for coupling said ring gear to said housing; and an actuator for actuating said first and second clutch assemblies, said actuator is operable for shifting said first clutch assembly into its actuated mode and said second clutch assembly into its non-actuated mode for establishing a high-range drive connection between said input shaft and said rear output shaft, and said actuator is operable for shifting said first clutch assembly into its non-actuated mode and said second clutch assembly into its actuated mode for establishing a low-range drive connection between said input shaft and said rear output shaft.

7. The transfer case of claim 6 wherein said first clutch assembly includes:

a clutch pack having a set of first clutch plates fixed for rotation with said input shaft and a set of second clutch plates fixed for rotation with said planet carrier and interleaved with said first clutch plates; and a thrust mechanism movable between a first position disengaged from said clutch pack for defining said non-actuated mode and a second position engaging said clutch pack for defining said actuated mode, and wherein said actuator is operable for moving said thrust mechanism between said first and second positions.

8. The transfer case of claim 6 wherein said second clutch assembly includes:

a clutch pack having a set of first clutch plates fixed for rotation with said ring gear, and a set of second clutch plates fixed to said housing and interleaved with said first clutch plates; and a thrust mechanism movable between a first position disengaged from said clutch pack for defining said non-actuated mode and a second position engaging said clutch pack for defining said actuated mode, said actuator is further operable for moving said thrust mechanism between said first and second positions.

9. A planetary gear assembly comprising:

an input shaft;

an output shaft;

a sun gear fixed to said input shaft;

a ring gear;

a planet carrier fixed to said output shaft and rotatably supporting a set of planet gears meshed with said sun gear and said ring gear;

a first clutch assembly operable in a non-actuated mode for permitting rotation of said planet carrier relative to said input shaft and operable in an actuated mode for coupling said planet carrier for rotation with said input shaft;

a second clutch assembly operable in a non-actuated mode for permitting relative rotation between said ring gear and a stationary component and operable in an actuated mode for coupling said ring gear to said stationary component; and an actuator for controlling the actuated modes of said first and second clutch assemblies to establish one of a high-range and a low-range drive connection between said input shaft and said output shaft, said actuator is operable for shifting said first clutch assembly into its actuated mode and said second clutch assembly into its non-actuated mode to establish said high-range drive connection, and said actuator is operable for shifting said first clutch assembly into its non-actuated mode and said second clutch assembly into its actuated mode to establish said low-range drive connection, and said actuator is further operable for shifting said first clutch assembly into its non-actuated mode and said second clutch assembly into its non-actuated mode such that said output shaft is disconnected from said input shaft.

10. The planetary gear assembly of claim 9 wherein said first clutch assembly includes a first clutch sleeve driven by said input shaft and movable between a first position uncoupled from said planet carrier for defining said non-actuated mode and a second position coupled to said planet carrier for defining said actuated mode, said actuator is operable for moving said first clutch sleeve between said first and second positions.

11. The planetary gear assembly of claim 10 wherein said second clutch assembly includes a second clutch sleeve driven by said ring gear and movable between a first position uncoupled from said stationary component for defining said non-actuated mode and a second position coupled to said stationary component for defining said actuated mode, said actuator operable for moving said second clutch sleeve between said first and second positions.

12. The transfer case of claim 9 wherein said first clutch assembly includes:

a first clutch plate fixed for rotation with said input shaft;

a second clutch plate fixed for rotation with said planet carrier; and a thrust mechanism movable between a first position disengaged from said clutch plates for defining said non-actuated mode and a second position engaged with said clutch plates for defining said actuated mode, said actuator operable for moving said thrust mechanism between said first and second positions.

13. The transfer case of claim 9 wherein said second clutch assembly includes:

a first clutch plate fixed for rotation with said ring gear;

a second clutch plate fixed to said stationary component; and a thrust mechanism movable between a first position disengaged from said clutch plates for defining said non-actuated mode and a second position for engaged with said clutch plates for defining said actuated mode, said actuator operable for moving said thrust mechanism between said first and second positions.

14. A planetary gear assembly comprising:

an input shaft;

an output shaft;

a sun gear fixed to said input shaft;

a ring gear;

a planet carrier fixed to said output shaft and rotatably supporting a set of planet gears meshed with said sun gear and said ring gear;

a first range sleeve coupled for rotation with said input shaft and movable between a neutral position whereat said planet carrier is free to rotate relative to said input shaft and a high-range position whereat said first range sleeve couples said planet carrier for common rotation with said input shaft;

a second range sleeve coupled for rotation with said ring gear and movable between a neutral position whereat said ring gear is free to rotate relative to a stationary component and a low-range position whereat said range sleeve couples said ring gear to said stationary component; and an actuator for moving said first and second range sleeves to establish one of a high-range drive mode, a low-range drive mode and a neutral non-driven drive mode, wherein said actuator is operable for locating said first range sleeve in its high-range position and said second range sleeve in its neutral position for establishing said high-range drive mode, wherein said actuator is operable for locating said first range sleeve in its neutral position and said second range sleeve in its low-range position for establishing said low-range drive mode, and wherein said actuator is operable for locating said first range sleeve in its neutral position and said second range sleeve in its neutral position for establishing said neutral non-driven mode.

15. The planetary gear assembly of claim 14 further comprising a first synchronizer for causing speed synchronization between said input shaft and said planet carrier in response to movement of said first range sleeve from its neutral position to its high-range position, and a second synchronizer for causing speed synchronization between said ring gear and said stationary component in response to movement of said second range sleeve from its neutral position to its low-range position.

* * * * *